United States Patent [19]

Garrett

[11] Patent Number: 4,887,189
[45] Date of Patent: Dec. 12, 1989

[54] AIRCRAFT INSTRUMENT ILLUMINATING APPARATUS

[75] Inventor: James R. Garrett, Highland Village, Tex.

[73] Assignee: Executive Technical Services, Inc., Addison, Tex.

[21] Appl. No.: 169,414

[22] Filed: Mar. 17, 1988

[51] Int. Cl.$^4$ ............................................. G01D 11/28
[52] U.S. Cl. ....................................... 362/23; 362/27; 362/62; 362/373
[58] Field of Search ........................ 362/23, 26, 27, 29, 362/30, 31, 62, 85, 373, 28

[56] References Cited

U.S. PATENT DOCUMENTS

| | | | |
|---|---|---|---|
| 2,602,036 | 7/1952 | Sullivan | 362/27 |
| 2,695,354 | 11/1954 | Neugass | 240/8.16 |
| 2,827,557 | 3/1958 | Neugan | 362/27 |
| 2,874,268 | 2/1959 | Martin | 362/27 |
| 2,905,807 | 9/1959 | Stevens | 240/8.16 |
| 2,963,571 | 12/1960 | Roggan | 362/23 |
| 3,450,870 | 6/1969 | Curl | 240/8.16 |
| 3,526,762 | 9/1970 | Blackwell | 362/27 |
| 3,629,568 | 12/1971 | Hanes | 362/27 |
| 3,757,270 | 9/1973 | Dupree | 362/31 |

Primary Examiner—Ira S. Lazarus
Assistant Examiner—Sue Hagarman
Attorney, Agent, or Firm—Hubbard, Thurman, Turner & Tucker

[57] ABSTRACT

A panel mounted aircraft cockpit instrument is provided with a specially designed illuminating section which is used to light the instrument without causing interference with the operation of night vision equipment in the cockpit. An infrared light-filtering illuminating section is removably secured within a front-accessible recessed portion of the instrument and includes a sealed, filtered housing in which one or more incandescent bulbs are disposed. Each bulb is resiliently supported within its housing using a resilient, electrically resistive yet relatively highly heat conductive supporting material. Heat generated by the bulb is conducted outwardly through its supporting material into a metal heat sink portion of the housing and then externally dissipated therefrom. The illuminating structure may be easily and quickly removed and replaced without the necessity of removing the instrument or gaining access to the rear of the panel. Additionally, the resilient support of each bulb helps to insulate it from mechanical shock and vibration, and the conductive heat sinking of the bulb significantly increases its operating life.

22 Claims, 3 Drawing Sheets

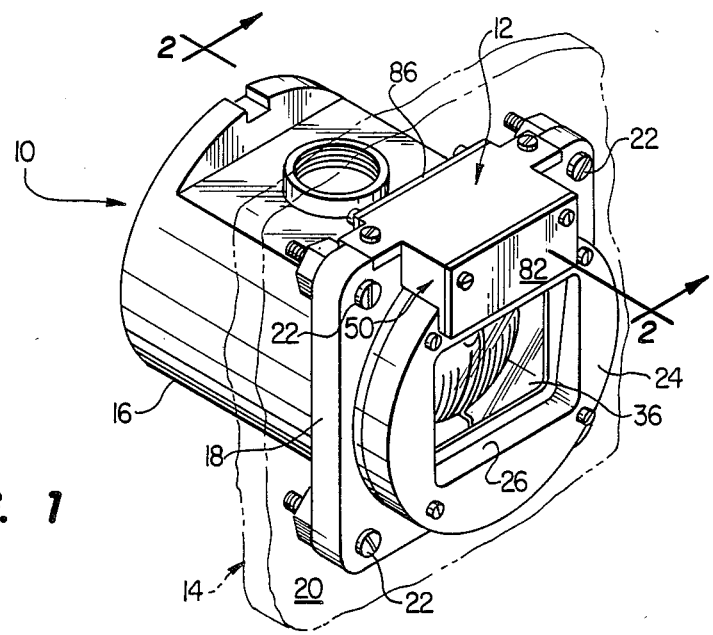
FIG. 1
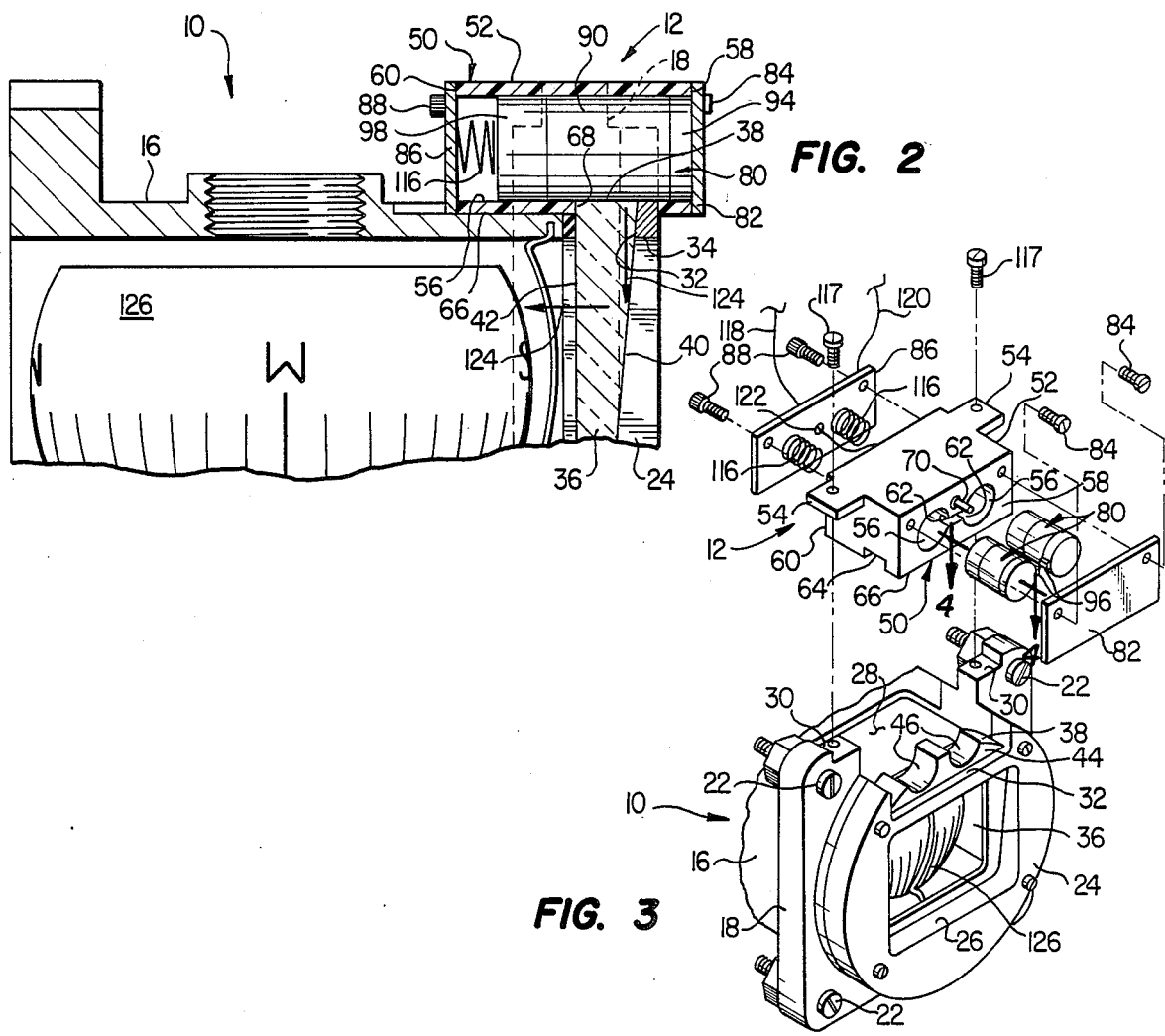
FIG. 2
FIG. 3

AIRCRAFT INSTRUMENT ILLUMINATING APPARATUS

BACKGROUND OF THE INVENTION

The present invention relates generally to the illumination of panel mounted aircraft cockpit instruments or the like. More particularly, in a preferred embodiment thereof, the present invention provides infrared light-filtered, easily removable instrument illuminating apparatus having significantly improved bulb support and heat dissipation characteristics.

Aircraft cockpit instruments, such as altimeters, compasses and the like, are typically illuminated for low light flying conditions by a series of small incandescent bulbs operatively mounted on the instrument panel adjacent the instruments to which they provide light. It is quite well known that the infrared light radiation generated by an illumination system of this general type seriously interferes with the use of night vision equipment such as night vision goggles worn by pilots and used to detect the infrared and near infrared signatures, even in total darkness, of target and reference objects on the ground. To alleviate this interference with night vision equipment, various types of infrared filter structures have been used in conjunction with the bulbs to shield the cockpit area from the infrared light radiation which they unavoidably generate.

Of necessity, the shielding of the bulbs with an infrared filter structure, particularly when each bulb is imbedded or encapsulated, traps a considerable amount of heat closely adjacent each bulb, thereby undesirably elevating its operating temperature and significantly reducing its operating life. Accordingly, conventional filtered bulbs must be rather frequently removed and replaced.

This bulb burnout problem commonly encountered in conventional night vision instrument illuminating systems is compounded in many instances by the often relatively inaccessible positioning of the bulbs (for example, behind the instrument panel), a mounting feature which often renders the bulb replacement process a laborious and time-consuming one.

In addition to causing the bulbs to overheat and burn out prematurely, conventional mounting systems used to position the bulbs in an illuminating relationship with the instruments often transmit to the rather delicate bulb filaments an undesirably high level of shock and vibration, thereby mechanically shortening the operating lives of the bulbs.

It can readily be seen from the foregoing that a need exists for improved aircraft instrument illuminating apparatus which is compatible with cockpit night vision equipment and eliminates or minimizes above-mentioned and other problems, limitations and disadvantages commonly associated with conventional instrument illumination systems of the general type described. It is accordingly an object of the present invention to provide such improved apparatus.

SUMMARY OF THE INVENTION

In carrying out principles of the present invention, in accordance with a preferred embodiment thereof, an aircraft instrument is provided which has a body portion insertable rearwardly through an opening in an instrument panel or otherwise positionable behind the panel, a front portion securable to the front of the panel, and a transparent faceplate captively retained within the front portion and peripherally bounded by an interior edge surface thereof. The faceplate has a wedge-shaped cross-section and has a thickened edge portion positioned adjacent an opening formed in the interior edge surface of the front portion of the instrument. This opening extends outwardly through the front portion and communicates with an outer edge recess formed therein.

A mounting block structure is removably secured within the recess and has a laterally spaced pair of circular bores formed therein which open laterally through undersurface openings in the mounting block positioned closely adjacent the thickened edge of the faceplate. Each of the bores axially and removably receives a specially designed sealed cylindrical light fixture housing, the housings being captively retained in the bores by a pair of metal cover plates removably secured to the mounting block over the front and rear ends of the bores. A pair of spring members disposed in the bores bias the housings into end engagement with the front cover plate.

Each of housings has a hollow tubular longitudinally intermediate portion which extends across the thickened faceplate edge portion and is formed from a suitable infrared light-filtering material. The opposite ends of this intermediate housing portion are covered by relatively thick metal end walls which function as conductive heat sinks and are bonded to the ends of the filter tube with a light blocking sealant material.

Disposed within the interior of each of the housings is a small "grain of wheat" type incandescent bulb, the lead wires of the bulb being electrically connected to the opposite metal end walls of the housing. The bulb is resiliently mounted within the housing by means of two resilient, electrically resistive yet relatively highly heat conductive material portions intersecured between opposite end portions of the bulb and the end walls of the housing. To assure that the filaments of the bulbs are oriented in their optimum light generating orientations relative to the thickened faceplate edge, small radial tabs are formed on the front end walls of the housings and are received in corresponding radial slots formed in front end portions of the mounting block bores, the cooperating tabs and slots also functioning to prevent axial reversal of the housings within their associated bores to thereby prevent misalignment between the bulb filaments and the thickened faceplate edge.

Suitable power transmitting means are incorporated in the illuminating structure to transmit electrical energy to the bulbs and selectively energize them. Light generated by the bulbs is transmitted outwardly through the infrared filter portions of the housings, and into the instrument faceplate through its thickened edge portion. Filtered light entering the wedge-shaped face plate in this manner is internally reflected rearwardly therefrom to operatively illuminate an interior portion of the instrument.

The illuminating structure defined by the mounting block, the cover plates and the two internal light fixture housings may be easily and quickly removed in its entirety and replaced without disturbing the balance of the instrument, and without the necessity of gaining access to the rear of the instrument panel. Alternatively, either or both of the light fixture housings may be removed from the in-place mounting block simply by removing the front cover plate thereon.

The resilient bulb-supporting material disposed within the housings appreciably reduces shock and vibration transmitted to the bulbs, thereby to a large extent protecting their filaments from mechanical damage. Heat generated by the bulbs within their sealed housings, which might otherwise cause premature bulb burnout, is conductively transferred from the bulbs through their resilient supporting material into the heat sink end walls of their housings, the conducted heat received by these heat sinks being externally dissipated therefrom through the mounting block structure.

While the illuminating structure just described is particularly well suited to applications requiring the suppression of infrared light radiation which would interfere with various night vision equipment in the cockpit, it will be readily appreciated that such structure would also be quite advantageous in applications where such suppression is not needed. In these applications, the central portions of the housings could be formed from a transparent nonlight-filtering material.

In an alternate embodiment of the present invention, a modified version of the previously described illuminating structure is removably secured within an outer edge recess formed in an instrument bezel member securable to the front surface of an instrument panel over the face of an existing instrument. A wedge-shaped transparent faceplate is retained within the bezel member and has a thickened edge portion which extends across an opening formed in the interior edge surface of the bezel and extending outwardly into an edge recess therein.

The modified illuminating structure comprises a metal heat sink housing member which is removably securable in the bezel recess and has an internal cavity extending outwardly through an opening in the undersurface of the metal housing. Sealed to the housing, and extending across this opening, is a filter plate formed from an infrared light-filtering material, the filter plate being held in a facing, closely adjacent relationship with the thickened edge portion of the transparent faceplate. The power transmitting means include a printed circuit board positioned against a surface of the internal cavity opposite from the filter plate, and a pair of external electrical lead wires operatively connected to the circuit board.

A plurality of small, incandescent "grain of wheat" type bulbs are disposed in a spaced, linear array within the internal cavity with their integral lead wires being electrically connected to the circuit board. The bulb are resiliently mounted within the metal heat sink housing by portions of the previously described resilient supporting material intersecured between the individual bulbs and the circuit board.

When the resiliently supported bulbs are energized, filtered light is generated into the faceplate, through its thickened edge portion, and is internally reflected rearwardly into the instrument across whose face portion the bezel member extends. Heat generated by the internal bulbs is conducted through their resilient supporting material and the circuit board into the heat sink housing from which the received heat is externally dissipated. The entire illuminating structure may be easily removed from the front-accessible bezel recess and replaced with another sealed illuminating unit when necessary.

BRIEF DESCRIPTION OF THE DRAWINGS

FIG. 1 is a somewhat simplified perspective view, partially in phantom, of a panel-mounted, illuminated aircraft cockpit instrument which embodies principles of the present invention;

FIG. 2 is an enlarged scale fragmentary cross-sectional view through the instrument taken along line 2—2 of FIG. 1;

FIG. 3 is a fragmentary, partially exploded perspective view of the instrument more clearly illustrating its unique illumination section;

DETAILED DESCRIPTION

Figure 4:
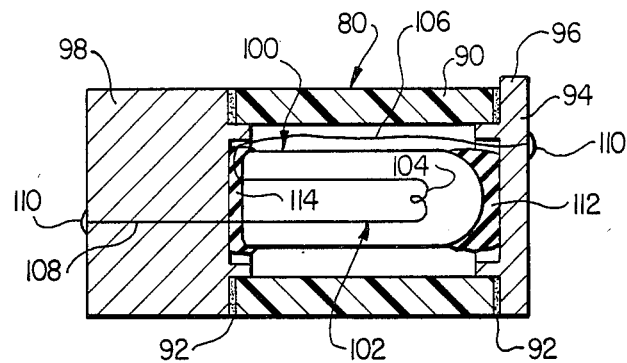
FIG. 4 is an enlarged scale cross-sectional view through a lighting element portion of the illumination section taken along line 4—4 of FIG. 3.
Figure 5:
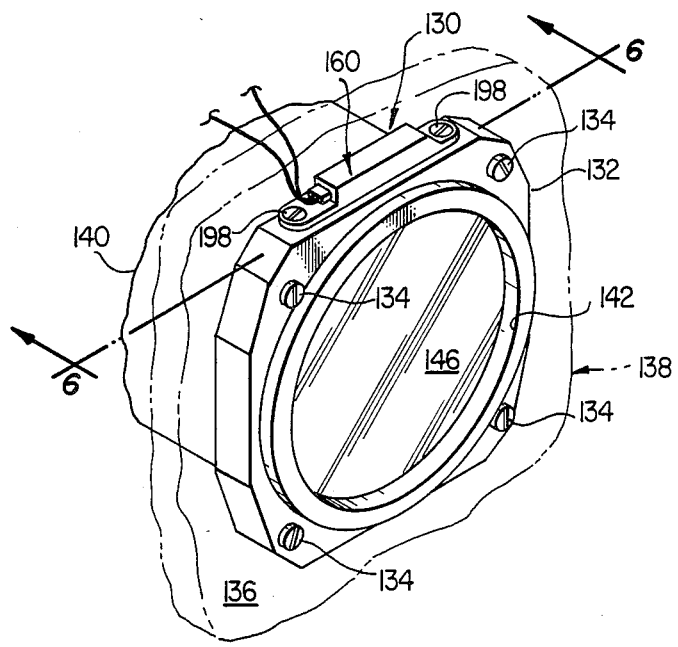
FIG. 5 is a somewhat simplified fragmentary perspective view, partially in phantom, of an alternate embodiment of the instrument in which an illuminated bezel member is utilized.

The present invention provides an aircraft instrument, f or example the compass 10 depicted in FIGS. 1-3, which is internally lit by a specially designed instrument illuminating structure 12 in a manner essentially precluding infrared light radiation from being generated into the cockpit from the structure 12 and interfering with night vision equipment being used in the cockpit. Instrument 10 is mounted on a panel 14 and includes a hollow body portion 16 recessed behind the panel through an opening therein (not shown) and a front mounting frame portion 18 secured to the front surface 20 of the panel 14 by mounting screws 22.

The front mounting frame 18 has a central cylindrical boss portion 24 having an opening 26 formed therein that is positioned over the panel opening in general alignment therewith. As best illustrated in FIG. 3, a recess 28 is formed on the upper side edge of the mounting frame 18 and extends downwardly into the boss 24, the recess defining a spaced pair of mounting ledges 30 on the upper side of the frame. Communicating with the lower end of the recess 28 is an opening 32 (FIG. 2) which extends upwardly through the interior edge surface 34 of the boss 24. Captively retained within the boss portion 24, and peripherally bounded by its interior edge surface 34, is a circular transparent faceplate member 36.

Faceplate 36 has a vertically tapered, generally wedge-shaped cross-section with a thickened upper edge portion 38 (FIGS. 2 and 3) and a considerably thinner lower edge portion (not visible in the drawings). As viewed in FIG. 2, the front side surface 40 of the faceplate 36 is rearwardly and downwardly tapered, while the rear side surface 42 is vertically disposed. For purposes later described, an upper peripheral portion 44 of the faceplate containing the thickened edge portion 38 projects upwardly through the boss opening 32 into the recess 28 and has a formed therein a pair of arcuate notches 46 (FIG. 3).

The illuminating structure 12 includes a molded plastic mounting block member 50 having a horizontally elongated rectangular body portion 52 from the opposite ends of which a pair of horizontal mounting tabs 54 extend. A pair of circular bores 56 extend through the block body 52 from its front side surface 58 to its rear side surface 60.

For purposes later described, small radial slots 62 are formed in the surfaces of the bores 56 along front end portions thereof. Additionally, a slot 64 is formed in the lower side surface 66 of the block body transversely to the bores 56 and forms a pair of openings 68 (FIG. 2) in the block body which extend upwardly into the bores 56. An internally spring loaded contact pin 70 projects forwardly from the front surface 58 of the block body.

Illuminating structure 12 also includes a pair of cylindrical light fixture housings 80 which are axially and removably insertable into the bores 56 and are captively retained therein by a front metal coverplate 82 secured to the front block body surface 58 by screws 84, and a rear coverplate 86 secured to the rear side surface 60 of the block body 52 by mounting screws 88.

Referring now to FIG. 4, each of the cylindrical housings 80 has a hollow tubular central longitudinal section 90 formed from a suitable infrared light-filtering material. Bonded to the front end of the filter section 90 (its right end as viewed in FIG. 4) with a suitable light blocking sealant material 92 is a generally disc-shaped metal end wall 94 with a radially outwardly projecting alignment tab 96 formed thereon. Bonded to the rear end of the tubular filter section 90, with sealant material 92, is a considerably thicker disc-shaped metal end wall 98. As will be seen, the front and rear housing end walls 94, 98 function as conductive heat sinks which dissipate bulb heat generated within the interior of the housing.

Disposed within the interior of each of the sealed fixture housings 80 is a small "grain of wheat" type incandescent bulb 100 having an internal filament structure 102 lying generally in a plane. The filament structure 102 has a filament element 104 positioned adjacent the housing end wall 94, and a pair of external lead wires 106, 108 which, as illustrated in FIG. 4, are respectively extended outwardly through the end walls 94, 98 and are electrically connected thereto as by solder points 110.

The bulb 100 is resilient mounted within the housing 80 by means of portions 112, 114 of a resilient, electrically resistive yet relatively highly heat conductive material intersecured between opposite ends of the bulb 100 and the facing interior side surfaces of the housing end walls 94, 98. A suitable material for this resilient bulb mounting use is a silicon-based material sold under the trade name "Sylgard" by the Dow Corning company.

In assembling the illuminating structure 12, the rear coverplate 86 is secured to the mounting block 50 with the screws 88 and a pair of small compression spring elements 116 are positioned in the mounting block bores 56 so that their rear ends engage the cover plate 86. The light fixture housings 80 are then inserted, rear end first, rearwardly into the bores 56 until their alignment tabs 96 are received in the bore slots 62. The front coverplate 82 is then secured to the mounting block with the screws 84, thereby captively retaining the housings 80 with the mounting block 50, the spring elements 116 forwardly biasing the housings to maintain their front end walls 94 in engagement with the inner side surface of the front coverplate 82.

The cooperation between the alignment tabs 96 and the bore slots 62 serves to automatically maintain the plane of the bulb filament structures 102 parallel to the plane of the lower side surface 66 of the mounting block body 52 with the filament elements 104 positioned directly over the openings 62 (FIG. 2) formed in the lower side surface of the mounting block body 52. This orients the filament structure 102 and its elements 104 in an optimum manner which maximizes the amount of light generated by the bulb 100 downwardly through its associated mounting block opening 62.

The cooperation between the alignment tabs 96 and the bore slots 62 also assures that the housings 80 cannot be axially reversed within the bores 56 (thereby misaligning the bulb filament elements 104 with the bore side openings 68). Specifically, it can be seen that if an attempt was made to insert either of the housings 80 front end first into its associated bore 56, the alignment tab 96 would axially bottom out on the rear surface of the slot 62 before the housing completely entered the bore, so that the front coverplate 82 could not be secured to the mounting block 50.

The assembled illuminating structure 12 is inserted downwardly into the front instrument recess 28 until the block mounting tabs 54 rest upon the ledges 30. The tabs 54 are then removably secured to the ledges 30 by means of attachment screws 117. With the structure 12 secured in this manner within the recess 28, the upper peripheral faceplate portion 44 is received within the lower side surface slot 64 of the mounting block body 52 and front portions of the filter sections 90, which extend across the block body lower side openings 62, are received within the arcuate faceplate notches 46 to position such front portions of the filter sections 90 closely adjacent the thickened upper side edge portion 38 of the transparent faceplate 36. As best illustrated in FIG. 1, the installed illuminating structure 12 is disposed entirely forwardly of the instrument panel 14 so that it can be easily and quickly removed from the instrument without disturbing the balance of the instrument or gaining access to the rear of the panel.

Electrical power, from a suitable external source thereof, is transmitted to the bulbs 100 within the sealed housings 80 by means of a pair of electrical lead wires 118 and 120. Lead wire 118 is extended through a small central opening 122 in the rear coverplate 86 and is electrically connected within the mounting block 52 to the spring biased contact pin 70 which engages the rear side surface of the front coverplate 82. During operation of the illuminating structure 12, electrical current is sequentially flowed inwardly through the lead wire 118 and the contact pin 70 into the front coverplate 82, rearwardly through the front housing end walls 94 and through the filament structures 102 through its lead wires 106 and 108, into the rear cover plate 86 via the rear housing end walls 98, and then into the lead wire 120 which is electrically connected to the rear coverplate 86.

The energized filament elements 104 generate light within the sealed housings 80 which is transmitted downwardly through the infrared filter sections 90 into the transparent faceplate 36 via its thickened edge portion 38. The infrared filtered light 124 (FIG. 2) downwardly entering the faceplate 36 is internally reflected rearwardly therein to illuminate an interior portion of the instrument 10, for example the compass wheel 126, without interfering with the operation of night vision equipment within the cockpit, such as night vision goggles worn by the pilot.

In addition to compactly providing for infrared filtration of the incandescent bulbs 100, the illuminating structure 12 also uniquely provides both mechanical and thermal protection for the filament structures 102.

For example, the resilient supporting material portions 112, 114 used to mount the bulbs 100 in their associated housings 80 significantly reduce the amount of mechanical shock and vibration transmitted to the bulbs 100 and thus to their filament structures 102. Additionally, bulb heat generated within the sealed housings 80 is conductively transferred to the heat sinking end wall portions 94, 98 of the housings 80 through the supporting material portions 112, 114, the heat received in the end walls 94, 98 being externally dissipated therefrom into the metal coverplates 82, 86 and the mounting block body 52. In this manner, overheating of the bulbs 100 is prevented, thereby preventing premature bulb burnout and significantly extending their operating lives.

As previously mentioned, the entire illuminating structure 12 may be easily and quickly removed from the front of the instrument panel and simply replaced with an entire new illuminating structure. Alternatively, of course, the individual sealed housing and bulb structures 80, 100 may be replaced in the in-place mounting block 50 simply by removing the front coverplate 82.

While the described illuminating structure 12 is particulary well suited to night vision applications in which it is necessary to illuminate an instrument in a manner preventing interference with various night vision equipment in the cockpit, the structure could also be used in applications in which it is not necessary to provide for infrared filtering of the incandescent bulbs 100. This alternate use of the described illuminating structure can be achieved simply by replacing the tubular filter sections 90 with non-filtering elements formed from a suitable transparent material. Moreover, while the illuminating structure 12 has been illustrated and described above as being incorporated into an aircraft instrument, it will be readily appreciated that the principles of the present invention could also be utilized in other types of cockpit illuminating devices such as external post lights.

Figure 6:
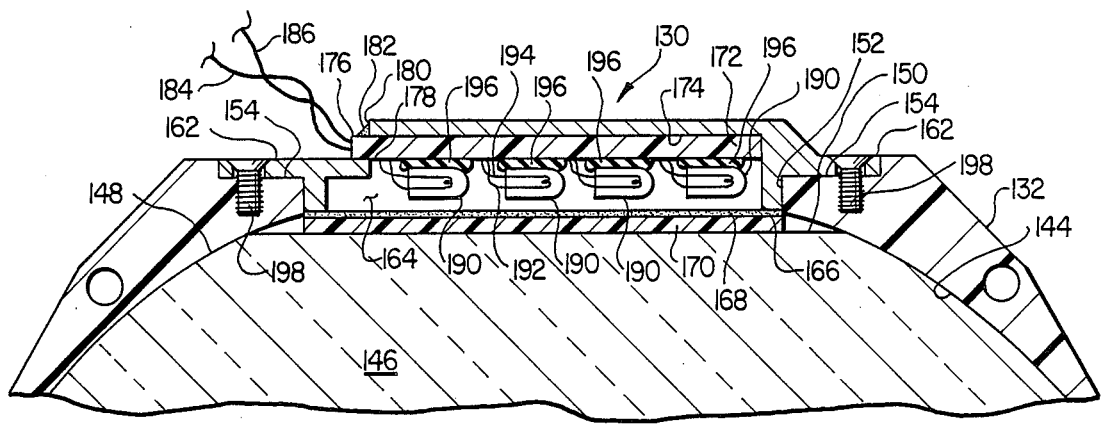
FIG. 6 is an enlarged scale fragmentary cross-sectional view through the bezel member taken along line 6—6 of FIG. 5.

Illustrated in FIGS. 5–8 is an alternate embodiment 130 of the previously described illuminating structure 12. The structure 130 is removably secured to the upper side of a bezel member 132 that is attachable by mounting screws 134 to the front face 136 of an instrument panel 138 over the front of an existing recessed instrument 140 to thereby define a front portion extension of the instrument. Bezel 132 has a central opening 142 formed therethrough and an inner edge portion 144 (FIG. 6) which peripherally borders a transparent faceplate 146 that extends across the opening 142. Faceplate 146, like the previously described faceplate 36, has a generally wedge shaped cross-section having a thickened upper peripheral edge portion 148. For purposes later described, a flattened portion 150 is formed along the upper face plate edge 148. An elongated recess 152 is formed downwardly through the upper side of the bezel 132 and through the interior bezel side edge 144 to the interior of the bezel. As best illustrated in FIG. 6, the flattened upper edge portion 150 of the faceplate 146 extends across and somewhat below the lower side of the recess 152. At its upper side, the recess 152 forms a pair of mounting ledges 154 at the opposite ends of the recess.

Figure 7:
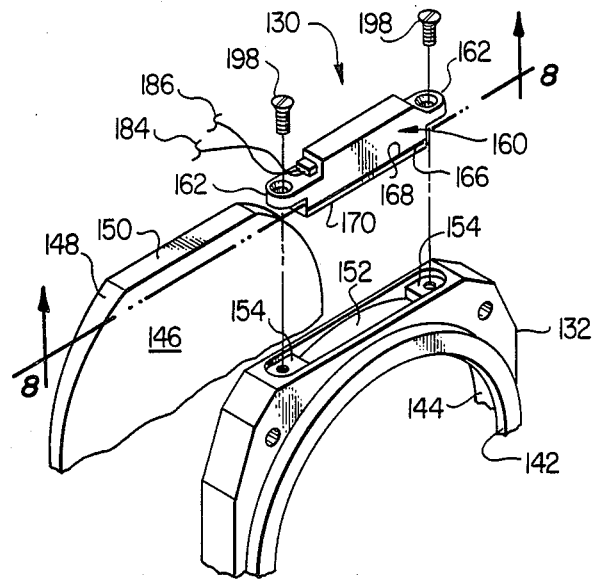
FIG. 7 is a fragmentary, partially exploded perspective view of the bezel member.
Figure 8:
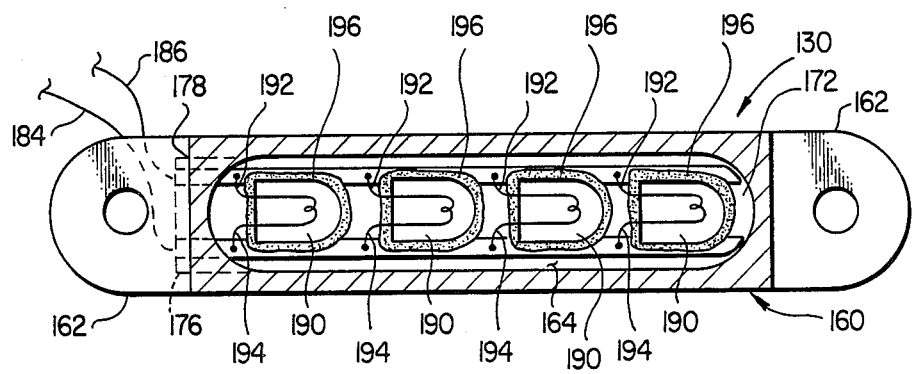
FIG. 8 is an enlarged scale cross-sectional view through the illuminating portion of the bezel member taken along line 8—8 of FIG. 7.

Referring now to FIGS. 6–8, the illuminating structure 130 includes an elongated, generally rectangular metal heat sink body 160 having mounting tabs 162 at its opposite ends. An elongated recess 164 is formed in the body 160 and opens downwardly through its lower side surface 166. Extending across the bottom opening of the recess 164, and bonded to the lower side surface 166 with a light blocking sealant material 168 is an elongated rectangular filter plate 170 formed from a suitable infrared light-filtering material.

An elongated printed circuit board strip 172 is secured to the upper side surface 174 of the recess 164 and has a left end portion 176 which projects outwardly through a slot 178 formed in an inner left end portion 180 of the body 160, the slot being sealed around the periphery of the board end portion 176 with a quantity of light blocking sealant 182. Electrical energy from an external source thereof is transmitted to the circuit board 172 by means of lead wires 184, 186 operatively connected to the board end portion 176.

Four small "grain of wheat" type incandescent bulbs 190 are positioned in a spaced, lengthwise array within the internal body recess or cavity 164 with their integral lead wires 192, 194 being electrically connected to the circuit board 172. The bulbs 190 are resiliently mounted within the body cavity 164 by means of small portions 196 of the resilient, electrically resistive yet relatively highly heat conductive material previously described in conjunction with the illuminating structure 12. The supporting material portions 196, as illustrated in FIGS. 6 and 8, are intersecured between the upper side surfaces of the bulbs 190 and the lower side surface of the printed circuit board 172.

To removably install the illuminating structure 130 in the bezel member 132, the heat sink body 160 is simply inserted downwardly into the bezel recess 152 until the mounting tabs 162 come to rest upon the mounting ledges 154. The structure 130 is then removably secured to the bezel 132 by mounting screws 198 which are extended downwardly through the tabs 162 and threaded into the mounting ledges 154. Installation of the illuminating structure 130 in this manner positions the infrared filter plate 170 against the flattened portion 150 of the thickened upper faceplate edge 148. Accordingly, when the bulbs 190 are energized, filtered light is generated downwardly into the faceplate 146 and internally reflected therefrom rearwardly into the interior of the instrument 140 to illuminate the same. The filter plate 170 may, of course, be replaced with a transparent, non-filter plate for applications in which use of night vision equipment is not anticipated.

It can readily be seen that the illuminating structure 130 can be easily and quickly removed from the bezel member 132 without removing the bezel member from the instrument panel and without the necessity for providing access to the existing instrument, or to the rear of the panel. During operation of the illuminating structure 130, bulb heat is conducted through the resilient supporting material 196 and the circuit board 172 into the heat sink body 160, and is then externally dissipated therefrom. In this manner, overheating of the bulbs 190 is eliminated, despite the fact that they are enclosed within what is in effect a sealed housing, to thereby essentially eliminate premature bulb burnout. The bulbs 190 are also to a significant degree isolated from mechanical vibration and shock due to the resiliency of the supporting, heat conducting material 196.

The foregoing detailed description is to be clearly understood as being given by way of illustration and example only, the spirit and scope of the present invention being limited solely by the appended claims.

What is claimed is:

1. Apparatus for illuminating an aircraft cockpit instrument or the like, comprising:

a sealed housing having an internal cavity bounded by a first exterior wall portion formed from a highly thermally conductive heat sink material, and a translucent second exterior wall portion;
bulb means, disposed within said internal cavity, for receiving electrical energy and responsively generating light within said internal cavity and outwardly through said translucent second exterior wall portion of said housing;
power transmitting means for transmitting electrical energy from a source thereof to said bulb means to energize the same; and
heat conducting means for defining a conductive heat flow path from said bulb means to said heat sink material, whereby heat generated by said bulb means is conducted to said heat sink material for external dissipation therefrom,
said heat conducting means including a resilient, electrically resistive yet relatively highly heat conductive material engaging and secured to said bulb means, interposed between said bulb means and said first exterior wall portion of said housing, and resiliently supporting said bulb means within said internal cavity.

2. The apparatus of claim 1 wherein:
said second exterior wall portion of said housing is of an infrared light filtering material.

3. The apparatus of claim 1 wherein:
said sealed housing has a hollow cylindrical configuration,
said first exterior wall portion of said housing defines opposite end wall portions thereof, and
said second exterior wall portion of said housing extends axially between said opposite end wall portions.

4. The apparatus of claim 3 wherein:
said bulb means include a bulb member having first and second lead wires operatively secured thereto, and
said power transmitting means include said lead wires and said end wall portions of said housing, said first lead wire being electrically connected to one of said end wall portions of said housing and said second lead wire being electrically connected to the other of said end wall portions of said housing, and said resilient, electrically resistive yet relatively highly heat conductive material has a first portion intersecured between a first exterior surface portion of said bulb member and one of said end wall portions of said housing, and a second portion intersecured between a second exterior portion of said bulb member and the other of said end wall portions of said housing.

5. The apparatus of claim 4 wherein:
said opposite end wall portions of said housing are bonded to opposite ends of said second exterior wall portion of said housing with a light blocking sealant material.

6. The apparatus of claim 1 wherein:
the instrument is recessable in a panel having a front surface, and has a front portion mountable on said front surface, and
said apparatus further comprises means for defining a front accessible recess in said front portion of the instrument adapted to removably receive said sealed housing, and means for captively retaining said sealed housing within said recess in a manner causing light generated outwardly through said second exterior wall portion of said housing to illuminate an interior portion of the instrument.

7. The apparatus of claim 1 wherein:
said internal cavity opens outwardly through an opening formed in an external surface of said first exterior wall portion of said housing, and
said second exterior wall portion of said housing is secured to said external surface and covers said opening therein.

8. The apparatus of claim 7 wherein:
said power transmitting means include a printed circuit board extending along a surface portion of said internal cavity generally opposite rom said opening,
said bulb means include a plurality of bulb elements disposed in said internal cavity between said opening and said printed circuit board and electrically connected to said printed circuit board, and
said resilient, electrically resistive yet relatively highly heat conductive material is intersecured between said printed circuit board and exterior surface portions of said plurality of bulb elements.

9. The apparatus of claim 7 wherein:
said second exterior wall portion of said housing is bonded to said external surface of said first exterior wall portion with a light blocking sealant material.

10. An illuminated aircraft cockpit instrument mountable on a panel having a front surface and an opening extending therethrough, said instrument comprising:
a hollow body portion having a front opening, said body portion being positionable to extend rearwardly of said panel opening with said front opening of said body portion being generally aligned with said panel opening;
a front portion securable to said front surface of said panel over said opening therein, said front portion having an opening extending rearwardly therethrough and peripherally bounded by an interior surface of said front portion, said interior surface having an opening extending outwardly therethrough and communicating with a recess formed in said front portion and opening outwardly through an exterior surface portion thereof;
a transparent faceplate carried within said front portion and positionable over said panel opening to provide a front view therethrough to the interior of said hollow body portion, said faceplate being peripherally bounded by said interior surface of said front portion and having a thickened peripheral edge portion positionable closely adjacent said opening in said interior surface of said front portion;
a sealed light fixture housing having an internal cavity bounded by a first exterior wall portion formed from a highly thermally conductive heat sink material, and a translucent second exterior wall portion;
mounting means for removably securing said light fixture housing within said recess to position said second exterior wall portion to extend across said opening in said interior surface of said front portion and to place said second exterior wall portion in close proximity to said thickened peripheral edge portion of said faceplate;
bulb means, disposed within said internal cavity, for receiving electrical energy and responsively generating light within said internal cavity and outwardly through said translucent second exterior wall portion of said light fixture housing into said faceplate through said thickened peripheral edge position thereof;

power transmitting means for transmitting electrical energy from a source thereof to said bulb means to energize the same; and heat conducting means for defining a conductive heat flow path from said bulb means to said heat sink material, whereby heat generated by said bulb means is conducted to said heat sink material for external dissipation therefrom, said heat conducting means including a resilient, electrically resistive yet relative highly heat conductive material engaging and secured to said bulb means, interposed between said bulb means and said first exterior wall portion of said light fixture housing, and resiliently supporting said bulb means within said internal cavity.

11. The instrument of claim 10 wherein:

said second exterior wall portion of said light fixture housing is of an infrared light filtering material, whereby the instrument may be readably illuminated by said bulb means without interfering with the operation of night vision equipment in the cockpit.

12. The instrument of claim 10 wherein:

said light fixture housing has a hollow cylindrical configuration, said first exterior wall portion of said light fixture housing defines opposite end wall portions thereof, and said second exterior wall portion of said light fixture housing has a hollow tubular configuration and extends axially between said opposite end wall portions.

13. The instrument of claim 12 wherein:

said bulb means include a bulb member having first and second lead wires operatively secured thereto, and said power transmitting means include said lead wires and said end wall portions of said light fixture housing, said first lead wire being electrically connected to one of said end wall portions of said housing and said second lead wire being electrically connected to the other of said end wall portions, and said resilient, electrically resistive yet relatively highly heat conductive material has a first portion intersecured between a first exterior surface portion of said bulb member and one of said end wall portions of said housing, and a second portion intersecured between a second exterior surface portion of said bulb member and the other of said end wall portions of said housing.

14. The instrument of claim 13 wherein:

said opposite end wall portions of said housing are bonded to opposite ends of said second exterior wall portion of said housing with a light blocking sealant material.

15. The instrument of claim 12 wherein:

said mounting means include a mounting block member having a circular bore formed therein and adapted to removably receive said light fixture, said mounting block member being removably securable within said recess and having an opening formed therethrough which communicates with said bore and is positioned to underlie said second exterior wall portion and be generally aligned with said opening in said interior surface of said front portion, said mounting means further including a cover plate securable over one of said bore to captively retain said housing therein.

16. The instrument of claim 15 further comprising:

spring means positionable in said bore for biasing said light fixture housing into engagement with said cover plate.

17. The instrument of claim 15 wherein:

said bulb means have a filament portion having an optimum orientation relative to said thickened peripheral edge portion of said faceplate, and said instrument further comprises cooperating alignment means on said housing and said mounting block member for permitting full insertion of said housing into said bore only when said housing is circumferentially positioned relative to said bore in a manner providing said optimum orientation.

18. The instrument of claim 17 wherein:

said cooperating alignment means include an interior surface slot formed in an outer end portion of said bore, and a radially outwardly projecting tab formed on one of said end wall portions of said housing and axially receivable in said slot as said housing enters said bore.

19. The instrument of claim 10 wherein:

said internal cavity opens outwardly through an opening formed in an external surface of said first exterior wall portion of said housing, and said second external wall portion of said housing is secured to said external surface and covers said opening therein.

20. The instrument of claim 19 wherein:

said front portion is a bezel member, and said recess extends inwardly through an exterior side edge surface thereof.

21. The instrument of claim 19 wherein:

said second exterior wall portion of said housing is bonded to said external surface of said first exterior wall portion with a light blocking sealant material.

22. The instrument of claim 19 wherein:

said power transmitting means include a printed circuit board extending along a surface portion of said internal cavity generally opposite from said opening, said bulb means include a plurality of bulb elements disposed in said internal cavity between said opening and said printed circuit board and electrically connected to said printed circuit board, and said resilient, electrically resistive yet relatively highly heat conductive material is intersecured between said printed circuit board and exterior surface portions of said plurality of bulb elements.

* * * * *